US012709107B2

(12) United States Patent
Tamura et al.

(10) Patent No.: US 12,709,107 B2
(45) Date of Patent: Aug. 18, 2026

(54) IMAGE RECORDING APPARATUS, CUTTER UNIT, AND METHOD FOR MANUFACTURING IMAGE RECORDING APPARATUS

(71) Applicant: BROTHER KOGYO KABUSHIKI KAISHA, Nagoya (JP)

(72) Inventors: Hikaru Tamura, Okazaki (JP); Hideaki Yoshimune, Nagoya (JP); Masatomo Yamaguchi, Inazawa (JP); Yuki Tsujimura, Konan (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 98 days.

(21) Appl. No.: 18/603,716

(22) Filed: Mar. 13, 2024

(65) Prior Publication Data

US 2024/0326479 A1 Oct. 3, 2024

(30) Foreign Application Priority Data

Mar. 30, 2023 (JP) ................................ 2023-056524

(51) Int. Cl.

*B41J 11/66* (2006.01)
*B41J 11/70* (2006.01)
*B41J 15/04* (2006.01)
*B41J 29/02* (2006.01)
*B41J 29/13* (2006.01)

(52) U.S. Cl.

CPC ............ *B41J 11/706* (2013.01); *B41J 15/04* (2013.01); *B41J 29/13* (2013.01)

(58) Field of Classification Search

CPC ........................................................ B41J 29/13
See application file for complete search history.

(56) References Cited

U.S. PATENT DOCUMENTS

| | | | | |
|---|---|---|---|---|
| 5,501,539 | A * | 3/1996 | Day | B41J 11/703 400/621 |
| 6,474,883 | B1 | 11/2002 | Kawakami et al. | |
| 6,786,376 | B1 | 9/2004 | Pitzen et al. | |
| 2013/0051892 | A1 | 2/2013 | Yokoe | |
| 2020/0087015 | A1* | 3/2020 | Stern | B41J 11/703 |
| 2021/0300083 | A1* | 9/2021 | Yamaguchi | B41J 29/13 |

FOREIGN PATENT DOCUMENTS

| | | | |
|---|---|---|---|
| JP | 2000-052291 | A | 2/2000 |
| JP | 2001-158141 | A | 6/2001 |
| JP | 2001-205896 | A | 7/2001 |
| JP | 2002-128328 | A | 5/2002 |
| JP | 2002-144657 | A | 5/2002 |

(Continued)

*Primary Examiner* — Scott A Richmond
(74) *Attorney, Agent, or Firm* — Baker Botts L.L.P.

(57) ABSTRACT

There is provided an image recording apparatus including: a conveyor configured to convey a recording medium; a recorder configured to record an image on the recording medium conveyed by the conveyor; a first cutter and a second cutter configured to cut the recording medium conveyed by the conveyor, a casing; and a protective member. The second cutter is configured to be in an attached state in which the second cutter is attached to the casing at an attachment position. The protective member is configured to intervene between the first cutter and the second cutter to be attached to the casing at the attachment position.

21 Claims, 10 Drawing Sheets

(56) References Cited

FOREIGN PATENT DOCUMENTS

| | | | |
|---|---|---|---|
| JP | 2003-533422 | A | 11/2003 |
| JP | 2011-056759 | A | 3/2011 |
| JP | 2013-049178 | A | 3/2013 |
| JP | 2015-061733 | A | 4/2015 |
| JP | 2015-214009 | A | 12/2015 |
| JP | 2021-160193 | A | 10/2021 |

* cited by examiner

IMAGE RECORDING APPARATUS, CUTTER UNIT, AND METHOD FOR MANUFACTURING IMAGE RECORDING APPARATUS

REFERENCE TO RELATED APPLICATIONS

This application claims priority from Japanese Patent Application No. 2023-056524 filed on Mar. 30, 2023. The entire content of the priority application is incorporated herein by reference.

BACKGROUND ART

A printer (image recording apparatus) provided with a conveying mechanism, a recording unit, a fixed blade (first cutter), a rotary blade (second cutter), a casing, and a cover that can open and close an opening of the casing is known. In some of such printers, the rotary blade can be exposed by allowing the cover to be at the open position, and the rotary blade can be manually moved to perform the repair and/or the replace, for example, in the case of any trouble. In other words, the fixed blade (first cutter) is supported by the casing, while the rotary blade (second cutter) is attachable and detachable with respect to the casing.

SUMMARY

In the construction in which the second cutter is attachable and detachable with respect to the casing, such as the construction described in Japanese Patent Application Laid-Open No. 2021-160193, when the second cutter transfers from the detached state in which the second cutter is detached from the casing to the attached state in which the second cutter is attached to the casing, then it is feared that the first cutter and the second cutter may be brought in contact with each other, and at least one of the first cutter and the second cutter may be damaged. If the cutter is damaged, any malfunction may arise in relation to the cutting of the recording medium.

An object of the present disclosure is to provide an image recording apparatus, a cutter unit, and a method for manufacturing an image recording apparatus capable of reducing damaging of at least one of a first cutter and a second cutter when the second cutter transfers from the detached state to the attached state in the construction in which the second cutter is attachable and detachable with respect to a casing.

According to an aspect of the present disclosure, there is provided an image recording apparatus including:

a conveyor configured to convey a recording medium;

a recorder configured to record an image on the recording medium conveyed by the conveyor;

a first cutter and a second cutter configured to cut the recording medium conveyed by the conveyor;

a casing; and a protective member, wherein:

the second cutter is configured to be in an attached state in which the second cutter is attached to the casing at an attachment position; and the protective member is configured to intervene between the first cutter and the second cutter to be attached to the casing at the attachment position.

According to another aspect of the present disclosure, there is provided a cutter unit configured to be attached to and detached from an image recording apparatus, the image recording apparatus having a conveyor and a recorder configured to record an image on a recording medium conveyed by the conveyor, the cutter unit including:

a cutter; and a protective member configured to cover a blade of the cutter, the protective member having a hardness smaller than a hardness of the blade, wherein the protective member is configured to be removably attached to the cutter unit.

According to another aspect of the present disclosure, there is provided an image recording apparatus including:

a conveyor configured to convey a recording medium;

a recorder configured to record an image on the recording medium conveyed by the conveyor;

a first cutter and a second cutter configured to cut the recording medium conveyed by the conveyor;

a casing; and a protective member, wherein:

the second cutter is detachably attached to the casing; and the protective member intervenes between the first cutter and the second cutter.

According to another aspect of the present disclosure, there is provided a method for manufacturing an image recording apparatus, the image recording apparatus including:

a conveyor configured to convey a recording medium;

a recorder configured to record an image on the recording medium conveyed by the conveyor;

a first cutter and a second cutter configured to cut the recording medium conveyed by the conveyor; and a casing, the method including:

attaching the second cutter to the casing; and transferring the protective member which intervenes between the first cutter and the attached second cutter to a state in which the protective member does not intervene between the first cutter and the second cutter.

According to the image recording apparatus and the method for manufacturing the image recording apparatus of the present disclosure, the protective member intervenes between the first cutter and the second cutter in a case that the second cutter transfers to the attached state from the detached state. Accordingly, the first cutter and the second cutter are not brought in contact with each other. It is possible to suppress at least one of the first cutter and the second cutter from being damaged.

According to the cutter unit of the present disclosure, the protective member is configured to cover the blade of the cutter, and the protective member is removable from the cutter unit. Accordingly, the protective member makes it possible to suppress the cutter from being damaged in a case that the cutter unit is attached to the image recording apparatus. Further, the protective member can be removed from the holder after the cutter unit is attached to the image recording apparatus.

DESCRIPTION

First Embodiment

Figure 1:
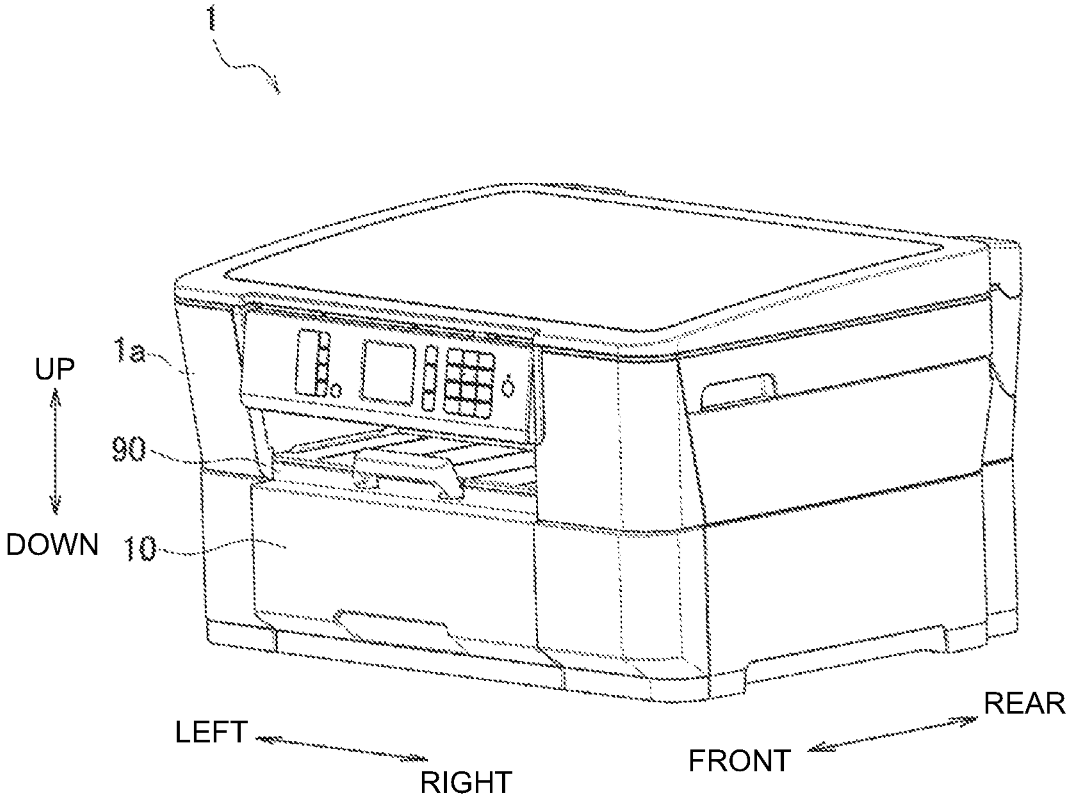
FIG. 1 is a perspective view of a printer.

As depicted in FIG. 1, a printer 1 (image recording apparatus) according to a first embodiment of the present disclosure includes a casing 1*a*, a paper feed tray 10 which is attachable and detachable with respect to the casing 1*a*, and a paper discharge tray 90.

Figure 2:
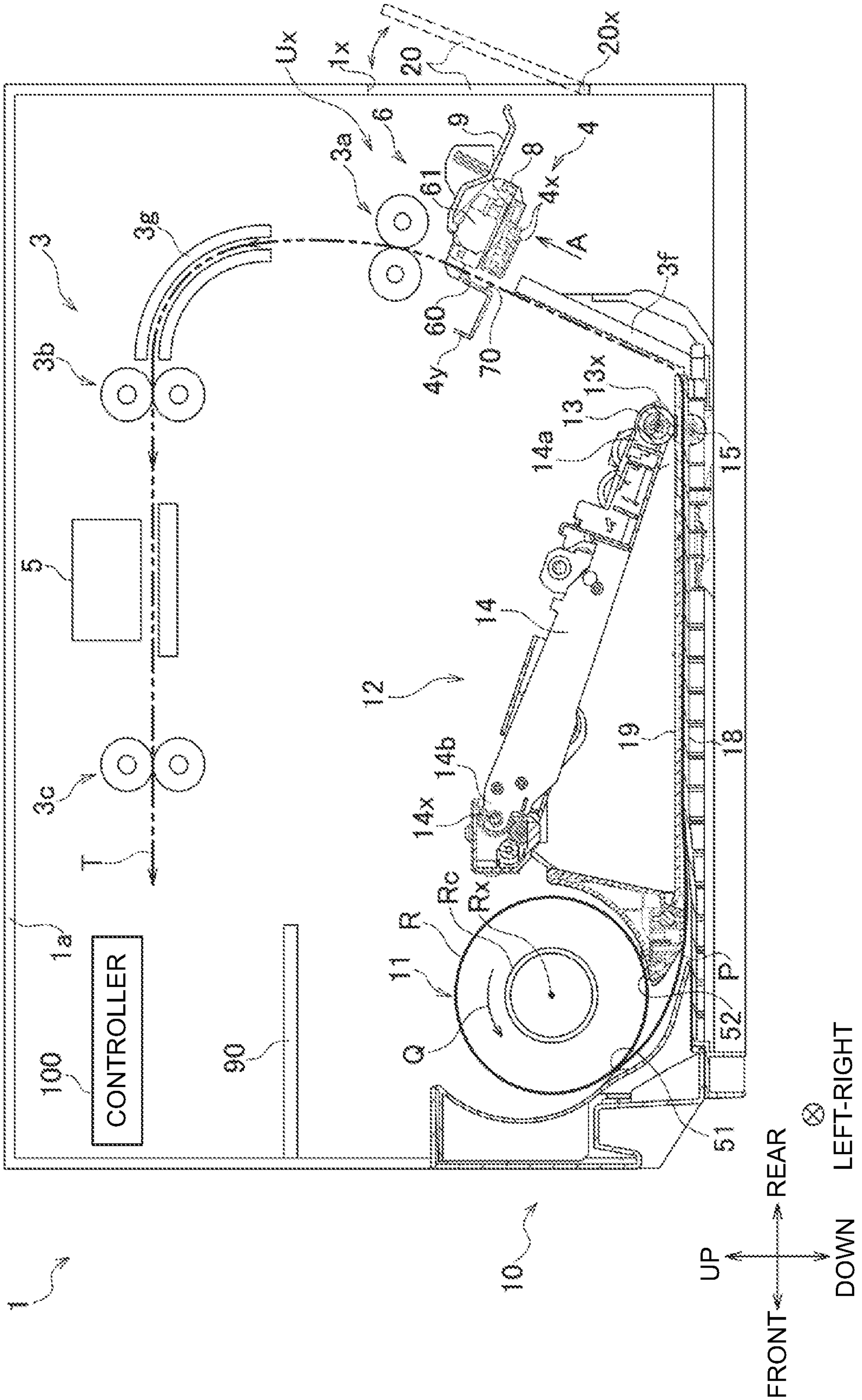
FIG. 2 is a schematic side view depicting an internal structure of the printer.

As depicted in FIG. 2, the printer 1 further includes a conveying mechanism 3, a head 5, a cutter unit 6, a cutter 70, a scanning mechanism 4, a film 68, and a controller 100. Components of the conveying mechanism 3 (except for rollers 51, 52 described later on), the head 5, the cutter unit 6, the scanning mechanism 4, and the controller 100 are supported by a casing 1*a*. The rollers 51, 52 are supported by the paper feed tray 10.

The conveying mechanism (conveyor) 3 is constructed so that the paper P is conveyed in the conveying direction along a conveyance route T. The conveying mechanism 3 includes the rollers 51, 52, a roller 13, an arm 14, roller pairs 3*a* to 3*c*, a separation member 3*f*, a pair of guide members 3*g*, and a conveyance motor (not depicted) for driving the respective rollers described above.

The conveyance route T is a route which starts from the paper feed tray 10, which passes through the space between the pair of guide members 3*g*, which passes under the head 5, and which is directed to the paper discharge tray 90. The conveyance route T has a U-shaped portion disposed upstream in the conveying direction of the head 5. The separation member 3*f*, the cutter unit 6, the roller pair 3*a*, and the pair of guide members 3*g* are arranged in the U-shaped portion. The cutter unit 6 and the roller pair 3*a* are arranged at a bottom portion Ux of the U-shaped portion. The cutter unit 6 is arranged at a position downstream in the conveying direction of the separation member 3*f* and upstream in the conveying direction of the roller pair 3*a*.

The paper feed tray 10 includes a rolled paper accommodating unit 11 which is capable of accommodating rolled paper R, and a cut paper accommodating unit 12 which is capable of accommodating a plurality of sheets of cut paper (not depicted) in a state of being stacked in the up-down direction. The cut paper, which is accommodated in the cut paper accommodating unit 12, is supported by the upper surface of a support plate 19 which is arranged along a bottom plate 18 of the paper feed tray 10. When the rolled paper R is used in the paper feed tray 10, the cut paper is removed from the cut paper accommodating unit 12 (see FIG. 2). When the cut paper is used, the rolled paper R is removed from the rolled paper accommodating unit 11.

The paper P collectively refers to the paper unwound from the rolled paper R, and the cut paper. The paper P is an example of a "recording medium". The cut paper refers to the sheet having a length along the conveyance route T shorter than a length along the conveyance route T of the sheet for constructing the rolled paper R.

As for the rolled paper R, the lengthy paper P is wound in a roll form around the outer circumferential surface of a cylindrical core member Rc. The rolled paper R is accommodated in the rolled paper accommodating unit 11 in a state in which the rotation axis Rx thereof (central axis of the core member Rc) extends in the left-right direction.

The rollers 51, 52 are arranged at the bottom portion of the rolled paper accommodating unit 11. The rollers 51, 52 are rotatable about the centers of shafts extending in the left-right direction. When the rolled paper R is accommodated in the rolled paper accommodating unit 11, the rolled paper R is supported by the rollers 51, 52 at the outer circumferential surface of the lower portion thereof. When the rolled paper R is set, then the rolled paper R is manually rotated in the direction of the arrow Q depicted in FIG. 2, and the paper P is unwound from the rolled paper R. Then, the paper P is allowed to pass through the gap between the lower surface of the support plate 19 and the upper surface of the bottom plate 18. The forward end of the paper P is interposed between the roller 13 and a roller 15. The conveyance motor is driven in accordance with the control of the controller 100 in this state, and the rollers 51, 52, 13 are rotated. Accordingly, the paper P, which is unwound from the rolled paper R, is fed backwardly.

The roller 13 is supported by one end 14*a* of the arm 14. The roller 13 is rotatable about a center of rotation that is a shaft 13*x* extending in the left-right direction. The other end 14*b* of the arm 14 is supported by the casing 1*a* by the aid of a shaft 14*x* extending in the left-right direction. The arm 14 is rotatable about a shaft 14*x* being a center of rotation by using the other end 14*b* as a supporting point.

In the state in which the paper feed tray 10 is attached to the casing 1*a*, when the cut paper is not accommodated in the cut paper accommodating unit 12, the roller 13 is brought in contact with the roller 15 (see FIG. 2). In the state in which the paper feed tray 10 is attached to the casing 1*a*, when the cut paper is accommodated in the cut paper accommodating unit 12, the roller 13 is brought in contact with the sheet of cut paper disposed at the uppermost layer of the cut papers accommodated in the cut paper accommodating unit 12. In this situation, the conveyance motor is driven in accordance with the control of the controller 100, and the roller 13 is rotated. Accordingly, the cut paper is fed backwardly.

The paper P (paper unwound from the rolled paper R accommodated in the rolled paper accommodating unit 11 or cut paper accommodated in the cut paper accommodating unit 12), which is fed by the roller 13 from the paper feed tray 10, is brought in contact with the separation member 3*f*. The paper P is moved along the separation member 3*f*, and is guided to the roller pair 3*a*.

The separation member 3*f* is arranged at the back of the roller 13. The separation member 3*f* extends in an oblique direction intersecting both of the up-down direction and the front-rear direction. Minute protrusions and recesses, which repeat along the conveyance route T, are formed on the surface of the separation member 3*f*. Owing to the protrusions and recesses, the overlapped feeding (phenomenon in which a plurality of sheets of cut paper are conveyed in an overlapped state) is suppressed. That is, the separation member 3*f* has the function to separate the sheet of cut paper brought in contact with the roller 13 from the other sheets of cut paper.

The head 5 (an example of a "recorder") includes a plurality of nozzles (not depicted) formed on the lower surface, and driver IC (not depicted). When the paper P, which is conveyed by the conveying mechanism 3, passes through the position opposed to the lower surface of the head 5, the driver IC is driven in accordance with the control of the controller 100. Accordingly, the ink is ejected (discharged) from the nozzles, the ink is landed on the paper P, and an image is recorded on the paper P. Note that the head 5 may be based on any one of the line system in which the ink is ejected from the nozzles in a state in which the position of the head is fixed and the serial system in which the ink is ejected from the nozzles as the head moves in the left-right direction.

The cutter unit 6 is constructed so that the paper P, which is unwound from the rolled paper R, is cut at a position between the separation member 3*f* and the roller pair 3*a* in the conveyance route T. The cutter unit 6 includes a cutter 60 and a holder 61 which holds the cutter 60. The cutter unit 6 is detachably attached to a carriage 8 supported by the casing 1*a*.

The carriage 8 is reciprocatively movable in the left-right direction by means of the scanning mechanism 4. The left-right direction is the direction which is parallel to the paper P disposed along the conveyance route T and which intersects the conveying direction A (see FIG. 2: conveying direction in the vicinity of the cutter unit 6).

Figure 3:
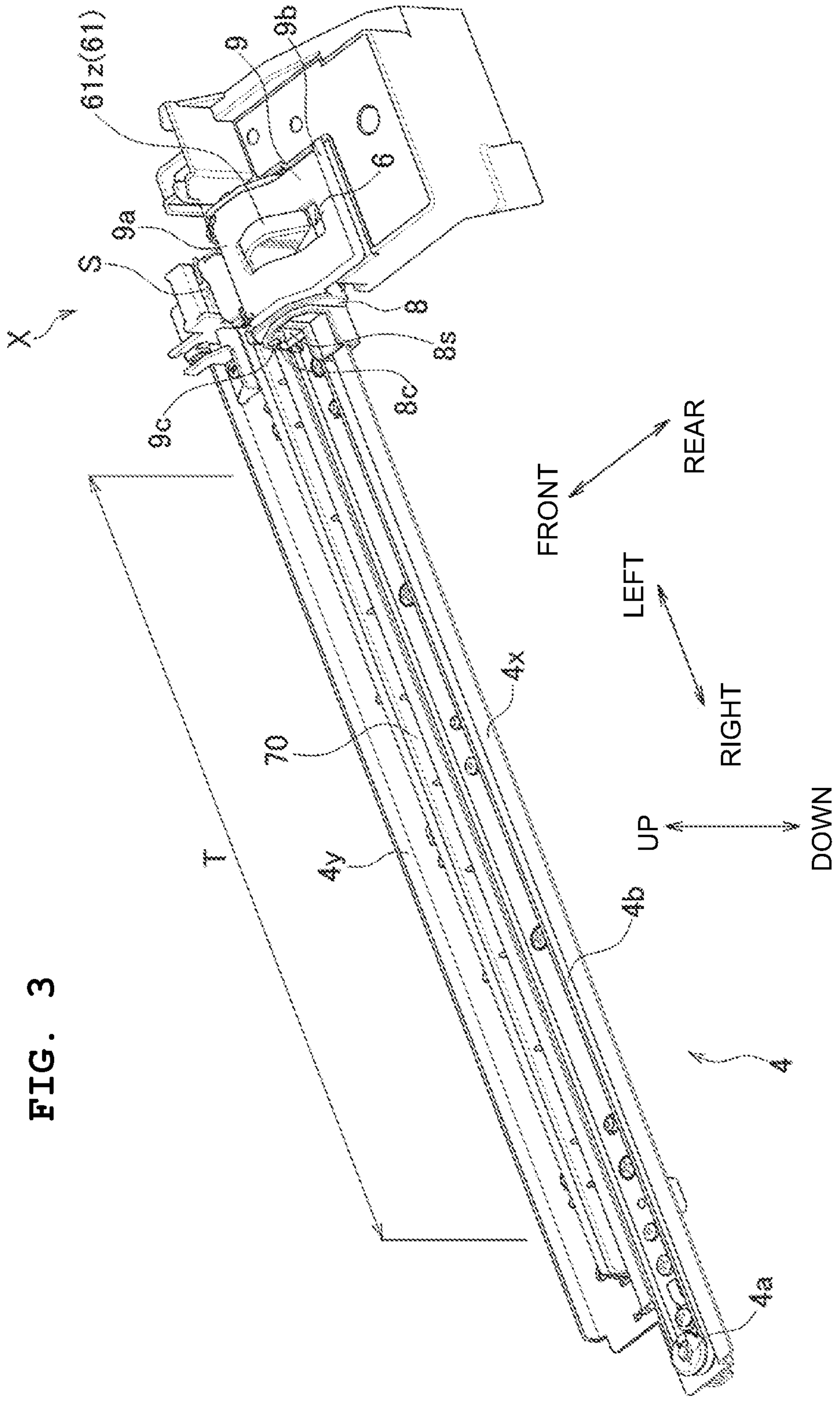
FIG. 3 is a perspective view depicting a scanning mechanism and a cutter unit included in the printer.

As depicted in FIG. 3, the scanning mechanism 4 includes a guide rail 4*x* which extends in the left-right direction, a pair of pulleys 4*a* which are separated from each other in the left-right direction (only one of the pair of pulleys 4*a* is depicted in FIG. 3), a belt 4*b* which is wound around the pair of pulleys 4*a* and to which the carriage 8 is fixed, and a cutting motor (not depicted). The pair of pulleys 4*a* and the belt 4*b* are attached to the guide rail 4*x*. The guide rail 4*x* supports the carriage 8 which is fixed to the belt 4*b* and the cutter unit 6 which is attached to the carriage 8.

Another guide rail 4*y* is arranged in front of the guide rail 4*x*. The guide rail 4*y* is opposed to the guide rail 4*x* with the conveyance route T being interposed between the guide rail 4*x* and the guide rail 4*y* (see FIG. 2). The guide rail 4*y* extends in the left-right direction, and the guide rail 4*y* is separated from the guide rail 4*x* with a slight gap defined between the guide rail 4*x* and the guide rail 4*y* in the front-rear direction. The conveyance route T is formed in the gap.

Another cutter 70 is attached to the guide rail 4*y*.

The cutter 70 is fixed, while the cutter 60 is rotatable. Further, the cutter 70 is supported by the casing 1*a*, while the cutter 60 is detachable and attachable with respect to the casing 1*a* (carriage 8) together with the holder 61. The cutter 60 and the cutter unit 6 including the cutter 60 can take the attached state (see FIG. 3) in which the cutter 60 and the cutter unit 6 are attached to the attachment position X of the casing 1*a* and the detached state in which the cutter 60 and the cutter unit 6 are detached from the attachment position X.

The cutter 70 is an example of a "first cutter", and the cutter 60 is an example of a "second cutter". The cutter 60 cooperates with the cutter 70 in the attached state to cut the paper P conveyed by the conveying mechanism 3. Each of the cutters 60, 70 is made of a metal material.

Figure 4:
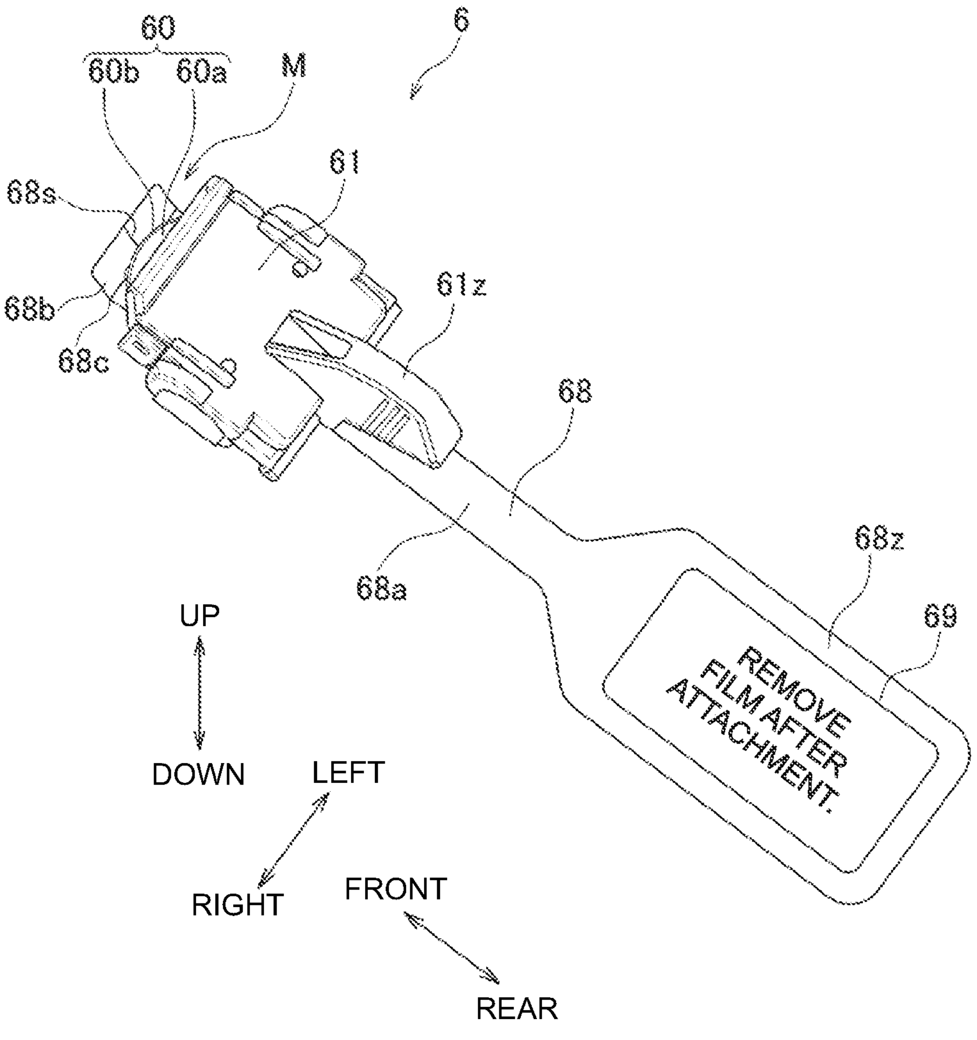
FIG. 4 is a perspective view of the cutter unit attached with a film, as viewed from an obliquely upward position.
Figure 5:
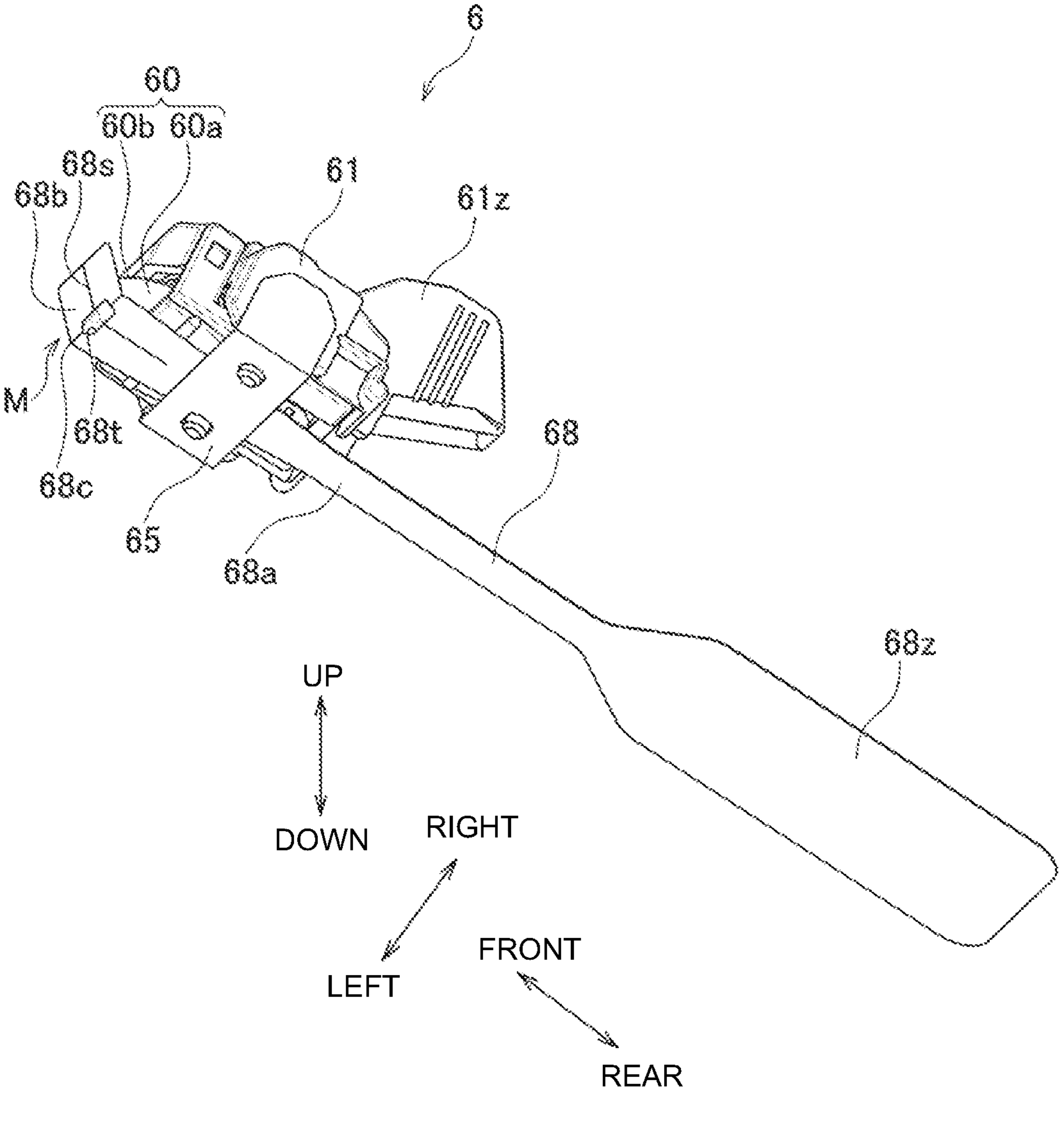
FIG. 5 is a perspective view of the cutter unit attached with the film, as viewed from an obliquely downward position.
Figure 6:
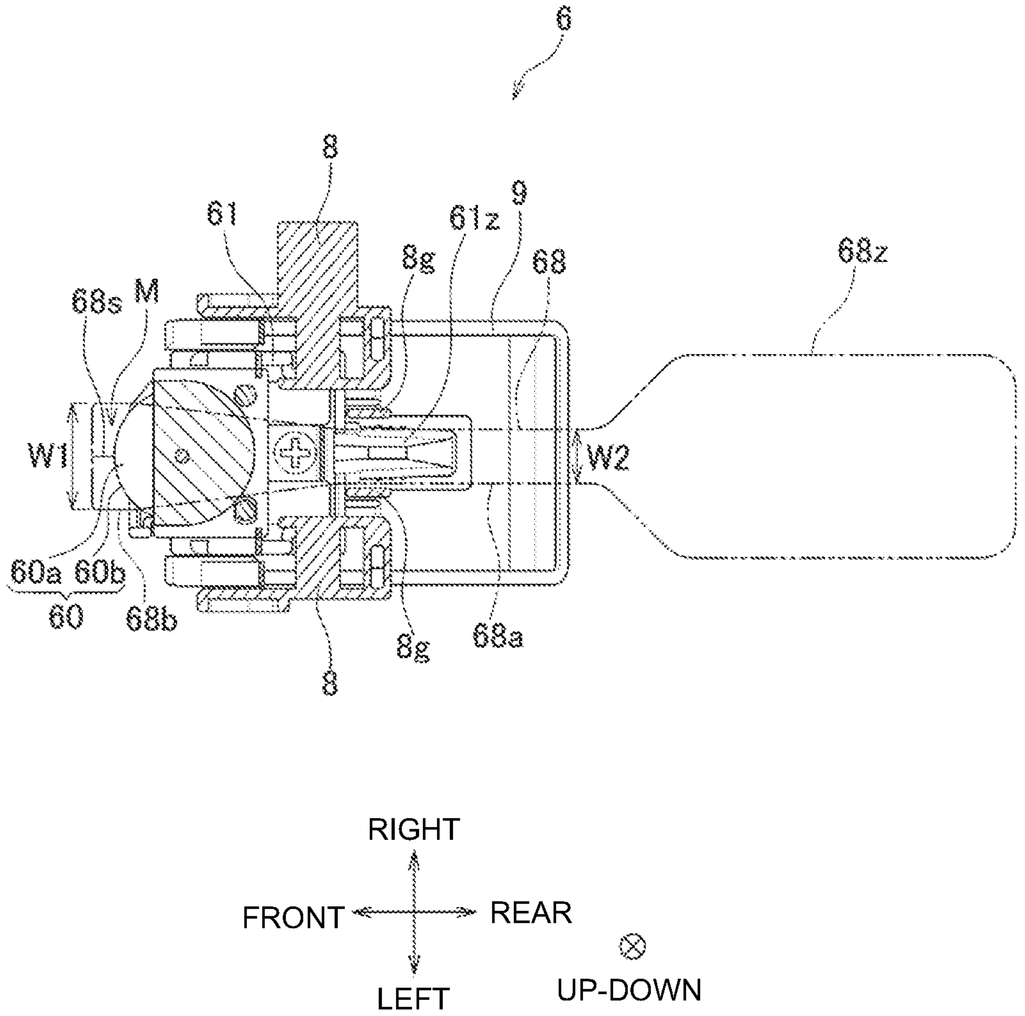
FIG. 6 is a partial sectional view of the cutter unit attached with the film, as viewed from a downward position.

As depicted in FIG. 4 to FIG. 6, the cutter 60 has a disk-shaped base portion 60*a*, and a blade 60*b* which is provided at the periphery of the base portion 60*a*. The blade 60*b* is a portion configured to cut the paper P. The base portion 60*a* is a portion rotatably held by the holder 61.

Figure 7A:
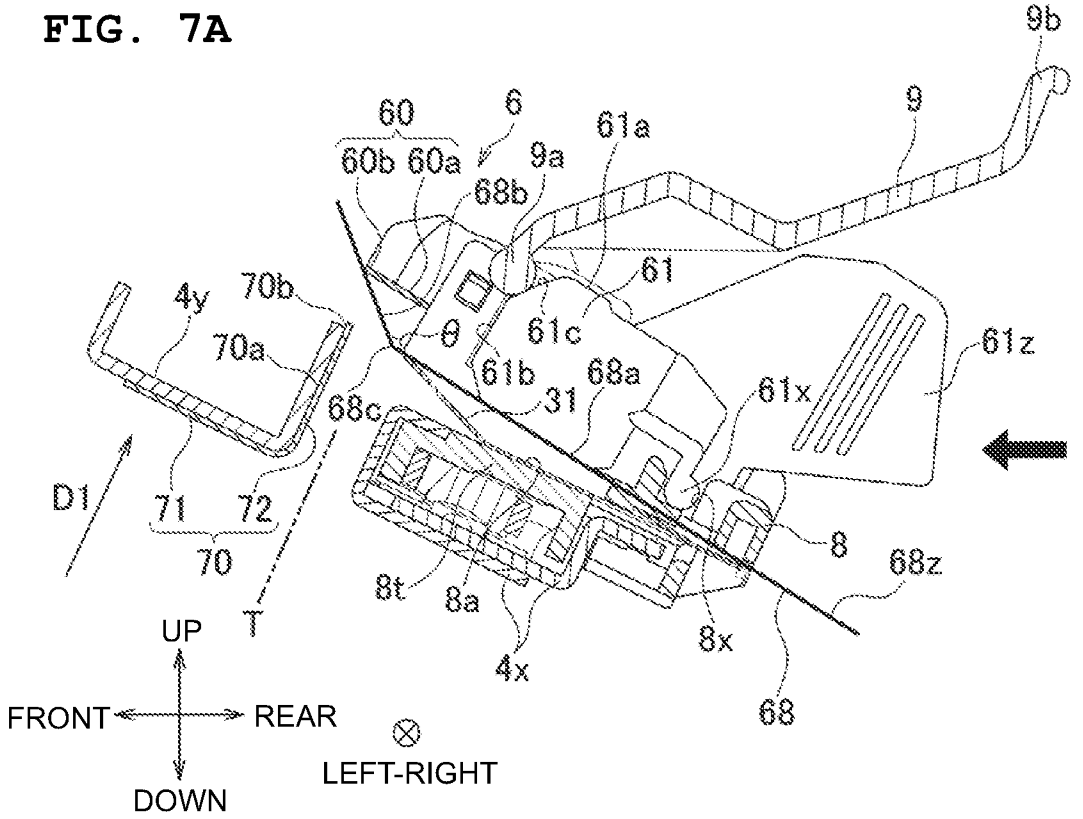
FIGS. 7A and 7B are side sectional views depicting a process of the cutter unit to transfers to an attached state from a detached state.
Figure 7B:
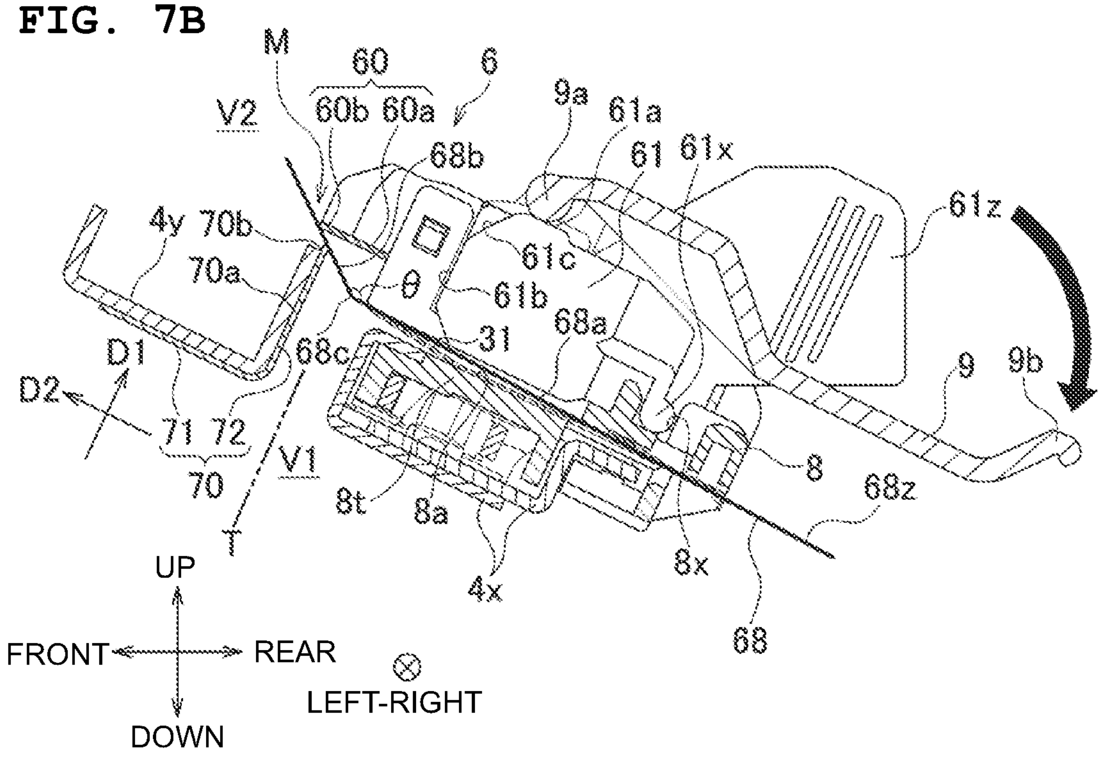

As depicted in FIGS. 7A and 7B, the cutter 70 is L-shaped, and the cutter 70 has a portion 71 which covers the lower surface of the guide rail 4*y* and a portion 72 which covers the side surface of the guide rail 4*y* for defining the conveyance route T. The portion 72 of the cutter 70 extends in the first direction D1 along the conveyance route T, and the portion 72 has a base portion 70*a* and a blade 70*b* which is provided at the forward end of the base portion 70*a*.

As depicted in FIG. 7B, when the cutter 60 is in the attached state, the cutter 60 is arranged so that the cutter 60 extends in the second direction D2 intersecting the first direction D1 and the blade 60*b* is disposed in the proximity of the blade 70*b*.

The base portion 70*a* is an example of a "first base", and the blade 70*b* is an example of a "first blade". The base portion 60*a* is an example of a "second base", and the blade 60*b* is an example of a "second blade".

When the cutting motor is driven in accordance with the control of the controller 100, then the belt 4*b* travels in the left-right direction, and the carriage 8 and the cutter unit 6 attached to the carriage 8 are moved into the conveyance route T from the attachment position X disposed outside the conveyance route T (see FIG. 3). Further, in this situation, the cutter 60 is rotated in accordance with the driving of the cutting motor. The paper P, which is unwound from the rolled paper R, is cut in the widthwise direction of the paper P by means of the cutter 70 which is fixed and the cutter 60 which is rotated while being moved in the left-right direction.

The attachment position X is disposed at the left ends of the guide rails 4*x*, 4*y*. As described above, the attachment position X is the home position of the movement of the carriage 8, and the attachment position X is also the position for attaching and detaching the cutter unit 6 with respect to the carriage 8. An attachment sensor S is provided at the attachment position X. The attachment sensor S is electrically connected to the controller 100. When the cutter unit 6 is attached to the carriage 8 at the attachment position X, then the attachment sensor S is brought in contact with the cutter unit 6, and thus the ON signal is outputted from the attachment sensor S to the controller 100. When the cutter unit 6 is detached from the carriage 8 at the attachment position X, then the attachment sensor S is separated from the cutter unit 6, and thus the OFF signal is outputted from the attachment sensor S to the controller 100. That is, the attachment sensor S detects that the cutter unit 6 in the attached state. When the recording is performed by using the rolled paper R, if the ON signal is received from the attachment sensor S, then the controller 100 controls the conveyance motor, the driver IC, and the cutting motor, and the controller 100 executes the recording process to record the image on the paper P.

An opening 1*x* (see FIG. 2) is formed on the back wall of the casing 1*a*. The portion, which includes the attachment position X in the casing 1*a* (carriage 8 disposed at the attachment position X), is exposed to the outside of the casing 1*a*. The opening 1*x* is formed at the portion of the casing 1*a* opposed to the bottom portion Ux of the U-shaped portion described above.

A cover 20, which covers the opening 1*x*, is attached to the back wall of the casing 1*a*. The cover 20 is rotatable about a shaft 20*x* which is provided at the lower end of the opening 1*x* and which extends in the left-right direction. When the cover 20 is rotated about the shaft 20*x* being the center of rotation, the cover 20 can thereby selectively take the closing position (see the solid line in FIG. 2) for closing the opening 1*x* and the opening position (see the broken line in FIG. 2) for opening the opening 1*x*.

When the cover 20 is arranged at the open position (see the broken line in FIG. 2), the cutter unit 6 can be thereby attached and detached with respect to the carriage 8 at the attachment position X via the opening 1*x*.

The carriage 8 has a bottom wall 8*t* (see FIGS. 7A and 7B) and a pair of side walls 8*s* which are separated from each other in the left-right direction (only one of the pair of side walls 8*s* is depicted in FIG. 3). The cutter unit 6 is arranged between the pair of side walls 8*s*. The cutter unit 6 is supported by a support surface 8*a* which is the upper surface of the bottom wall 8*t* (see FIGS. 7A and 7B). A plate spring 31 is attached to the support surface 8*a*. The cutter unit 6 is supported by the support surface 8*a* in a state in which the urging force directed upwardly is applied to the cutter unit 6 by the plate spring 31.

As depicted in FIG. 3, a lever 9 is attached to the carriage 8. The lever 9 has a shaft 9*c* extending in the left-right direction. The lever 9 is rotatable with respect to the carriage 8 about the shaft 9*c* being the center of rotation. The shaft 9*c* is inserted into holes 8*c* which are formed through the side walls 8*s* of the carriage 8.

The lever 9 is rotated about the shaft 9*c* being the center of rotation. Accordingly, the lever 9 can selectively take a release position (see FIG. 7A) for releasing the fixation of the cutter unit 6 with respect to the carriage 8 and a fixed position (see FIG. 7B) for fixing the cutter unit 6 with respect to the carriage 8.

When the cutter unit 6 is attached to the carriage 8, the user moves the cutter unit 6 frontwardly to insert the cutter unit 6 into the space between the pair of side walls 8*s* of the carriage 8 (see FIG. 3) while gripping a handle 61*z* provided at the rear end of the holder 61 in a state in which the lever 9 is disposed at the release position (see FIG. 7A). Accordingly, temporary positioning of the cutter unit 6 is performed in the left-right direction with respect to the carriage 8 by means of the pair of side walls 8*s*. In this situation, a protrusion 61*x*, which is provided at the rear end of the holder 61, is arranged in a recess 8*x* of the carriage 8. Further, the front end portion of the cutter unit 6 is lifted upwardly by the urging force of the plate spring 31, and the blades 60*b*, 70*b* are separated from each other. Further, in this situation, a front end 9*a* of the lever 9 is brought in contact with an inclined surface 61*c* which is formed at the boundary between an upper surface 61*a* and a front surface 61*b* of the holder 61.

After that, a back end 9*b* of the lever 9 is pushed and moved downwardly.

Accordingly, the lever 9 is moved from the release position (see FIG. 7A) to the fixed position (see FIG. 7B). In this situation, the front end 9*a* of the lever 9 is moved along the inclined surface 61*c* of the holder 61. The front end 9*a* of the lever 9 arrives at the upper surface 61*a* of the holder 61. In accordance therewith, the front end 9*a* of the lever 9 presses the upper surface 61*a* of the holder 61. The cutter unit 6 is pressed toward the support surface 8*a* against the urging force of the plate spring 31. Accordingly, the cutter unit 6 is fixed with respect to the carriage 8. In this situation, the space between the blade 60*b* the blade 70*b* is smaller than the space provided when the lever 9 is disposed at the release position (see FIG. 7A), and is a predetermined space appropriate to cut the paper P.

Figure 8:
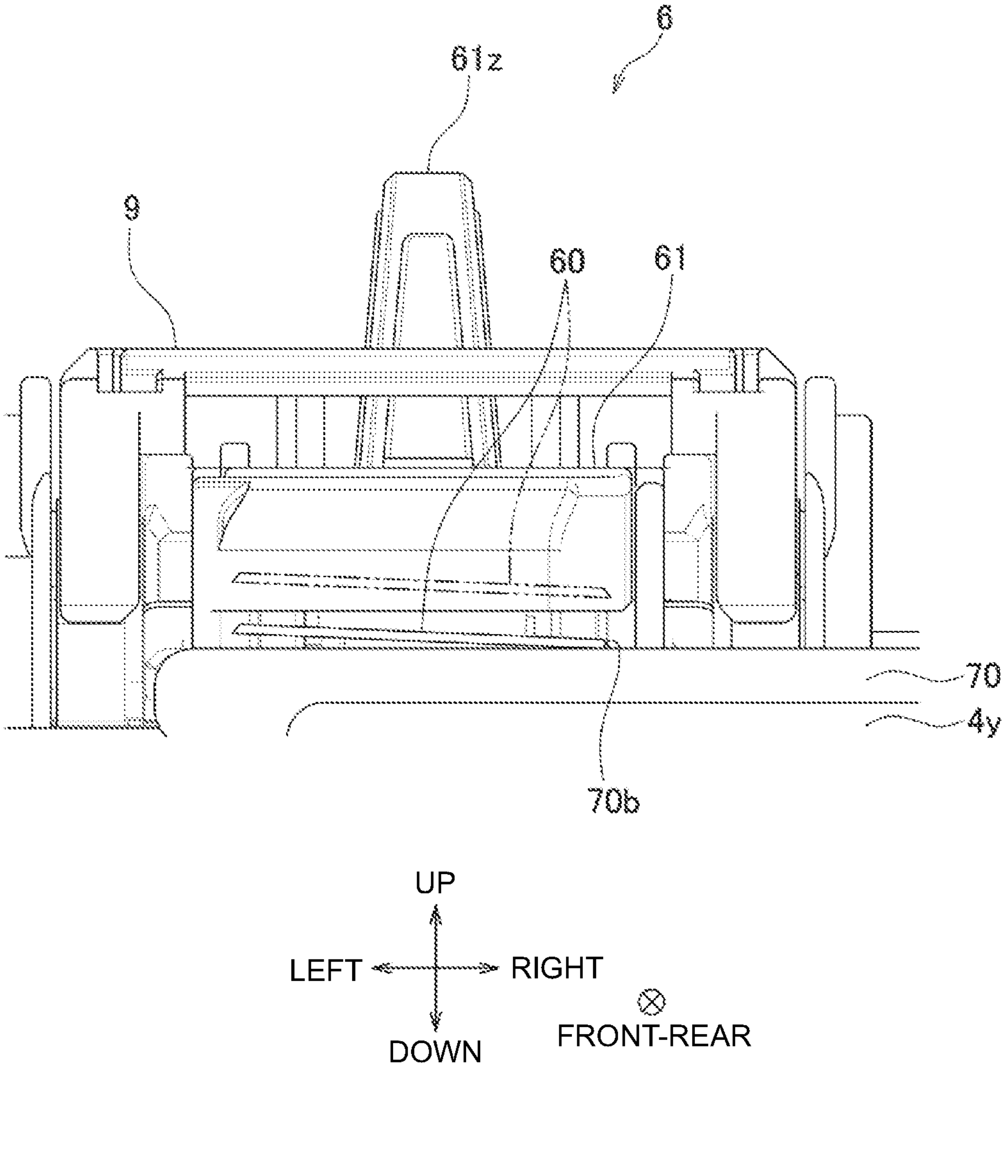
FIG. 8 is a partial enlarged view of the cutter unit as viewed from a front position.

Note that as depicted in FIG. 8, the cutter 60 is attached to the holder 61 in such an attitude that the cutter 60 is not parallel to the left-right direction but the cutter 60 is inclined in a manner that the right end of the cutter 60 is positioned lower than the left end of the cutter 60. On this account, when the cutter 60 is in the attached state, the right end of the cutter 60 is proximate to the blade 70*b* of the cutter 70.

In a case that the cutter unit 6 is removed from the carriage 8, the user lifts the rear end 9*b* of the lever 9 upwardly so as to move the lever 9 from the fixed position (see FIG. 7B) to the release position (see FIG. 7A). In this situation, the front end 9*a* of the lever 9 is moved from the upper surface 61*a* to the inclined surface 61*c* of the holder 61. In accordance therewith, the cutter unit 6 is released from the pressing having been exerted by the front end 9*a* of the lever 9. The front end portion of the cutter unit 6 is moved upwardly by the urging force of the plate spring 31 in the state in which the protrusion 61*x* is arranged in the recess 8*x*. In this situation, the space between the blade 60*b* and the blade 70*b* is larger than the space provided when the lever 9 is disposed at the fixed position (see FIG. 7B).

After that, the user moves the cutter unit 6 backwardly to pull out the cutter unit 6 from the pair of side walls 8*s* of the carriage 8 (see FIG. 6) while gripping the handle 61*z* provided at the rear end of the holder 61 in the state in which the lever 9 is disposed at the release position (see FIG. 7A). Accordingly, the cutter unit 6 is removed from the carriage 8.

In relation thereto, when the cutter unit 6 transfers to the attached state (see FIG. 7B) from the detached state (see FIG. 7A), if the cutter 60 and the cutter 70 are brought in contact with each other, then it is feared that at least one of the cutter 60 and the cutter 70 may be damaged. In this embodiment, the film 68 (an example of a "protective member") is provided so that the cutter 60 and the cutter 70 are not brought in contact with each other when the cutter unit 6 transfers to the attached state from the detached state.

As depicted in FIG. 4 and FIG. 5, the film 68 is attached to the cutter unit 6. The film 68 is a thin film member which is made of, for example, a resin material such as polyethylene terephthalate or the like. The hardness of the film 68 is smaller than the hardness of the cutter 60, and the hardness of the cutter 70. The thickness of the film 68 is about 0.5 to 1.0 mm.

The film 68 is attached to the holder 61 so that the blade 60*b* disposed at the front end of the cutter 60 is covered with the film 68. The film 68 has a bent portion 68*c* which is provided in the vicinity of the blade 60*b*, a first portion 68*a* which is disposed at the rear with respect to the bent portion 68*c*, and a second portion 68*b* which is disposed at the front with respect to the bent portion 68*c*. In other words, the film 68 has the first portion 68*a*, the second portion 68*b*, and the bent portion 68*c* which is disposed at the boundary between the first portion 68*a* and the second portion 68*b*.

The film 68 is attached to the holder 61 by fixing the first portion 68*a* to the bottom surface of the holder 61 by means of, for example, a double-sided tape. Further, as depicted in FIG. 5, the cutter unit 6 includes a U-shaped fixed member 65 which is fixed to the holder 61 so that the fixed member 65 covers the film 68 from the position below the film 68. The fixed member 65 has a bottom portion which extends in the left-right direction, and a pair of side portions which protrude upwardly from the both left and right ends of the bottom portion. The pair of side portions are fixed to the side surfaces of the holder 61 by means of, for example, a double-sided tape.

The cutter unit 6 is attached to the carriage 8 in a state in which the film 68 is attached to the cutter unit 6 (see FIGS. 7A and 7B). After the cutter unit 6 reaches the attached state, the film 68 can be removed backwardly (in the removal direction) from the attachment position X when the cutter unit 6 is in the attached state. The removal direction is the direction directed from the second portion 68*b* to the first portion 68*a*. Further, the removal direction is also the extending direction in which the film 68 extends from the proximity position M between the cutter 60 and the cutter 70 when the cutter unit 6 is in the attached state.

The film 68 has a grip portion 68*z* which is disposed at the rear end of the film 68 (at the downstream end in the removal direction). The length (width) in the left-right direction (widthwise direction intersecting the removal direction) of the grip portion 68*z* is larger than lengths (widths) of the other portions. The grip portion 68*z* has a shape to be easily gripped by the user during the operation for removing the film 68. A label 69 is stuck to the surface of the grip portion 68*z*. Information, which prompts (indicates) the user not to remove the film 68 at a timing before the cutter unit 6 reaches the attached state, is written on the label 69. The grip portion 68*z* protrudes to the outside of the casing 1*a* via the opening 1*x* during the operation in which the cover 20 is arranged at the open position (see the broken line in FIG. 2) to attach the cutter unit 6 to the carriage 8.

As depicted in FIG. 6, the carriage 8 has a pair of guide portions 8*g* which is disposed on the both sides in the left-right direction of the film 68 so that the film 68 is pinched by (or interposed between without being pinched) the pair of guide portions 8*g*. An area (front portion) of the film 68, which is attached to the holder 61, has a tapered shape in which the length (width) in the left-right direction is gradually decreased toward the rear. The width of the film 68 in the area is longest (width W1) at the front end (proximity position M) and shortest (width W2) at the portion at which the film 68 is pinched by or interposed between the pair of guide portions 8*g*.

As depicted in FIG. 5, the film 68 is formed with a slit 68*s* which extends backwardly (in the removal direction) while ranging over the second portion 68*b* and the front end portion of the first portion 68*a*. Further, a long hole (slot) 68*t* is formed at the bent portion 68*c* of the film 68. The long hole 68*t* intersects the slit 68*s*. The length of the long hole 68*t* in the left-right direction (direction intersecting the direction in which the slit 68*s* extends) is longer than the length in the front-rear direction (direction in which the slit 68*s* extends).

When the cutter unit 6 transfers to the attached state from the detached state, the film 68 intervenes between the cutter 70 and the cutter 60 (see FIGS. 7A and 7B). As for the film 68, the angle of intersection θ, which is defined between the first portion 68*a* and the second portion 68*b*, is an obtuse angle.

When the cutter unit 6 is in the attached state, the second portion 68*b* of the film 68 is opposed to the blade 60*b* of the cutter 60 (see FIG. 7B).

Further, when the cutter unit 6 is in the attached state, the first portion 68*a* and the bent portion 68*c* of the film 68 are arranged in the first space V1 which is interposed between the base portion 70*a* of the cutter 70 and the base portion 60*a* of the cutter 60. The second portion 68*b* of the film 68 extends from the first space V1 through the proximity position M to the second space V2 which is disposed on the side opposite to the first space V1 with respect to the proximity position M.

As described above, according to this embodiment, when the cutter 60 transfers to the attached state from the detached state, the film 68 intervenes between the cutter 70 and the cutter 60 (see FIGS. 7A and 7B). Accordingly, the cutter 70 and the cutter 60 are not brought in contact with each other. It is possible to suppress at least one of the cutter 70 and the cutter 60 from being damaged. Note that, in a case that the cutter 60 is in the attached state and the film 68 intervenes between the cutter 70 and the cutter 60, the film 68 may be in contact with the cutter 60 and the cutter 70 as depicted in FIG. 7B.

The film 68 can be removed from the attachment position X when the cutter 60 is in the attached state. In other words, the film 68 can be transferred from an intervening state in which the film 68 intervenes between the cutter 70 and the cutter 60 to a removed state in which the protective member does not intervene between the cutter 70 and the cutter 60, in a case that the cutter 60 is in the attached state. If the film 68 cannot be removed from the attachment position X, then the cutting action is performed in a state in which the film 68 intervenes between the cutter 70 and the cutter 60, and thus any malfunction may arise in the cutting of the paper P. In relation thereto, in this embodiment, it is possible to suppress such a problem.

The film 68 has the grip portion 68*z* which is disposed at the downstream end (rear end) in the removal direction of the film 68 (see FIG. 4). In this case, the user can easily remove the film 68 by gripping the grip portion 68*z*.

The information, which prompts (indicates) the user not to remove the film 68 at a timing before the cutter 60 reaches the attached state, is written on the grip portion 68*z* (see FIG. 4). In this case, it is possible to prevent the user from erroneously removing the film 68 before the cutter 60 reaches the attached state. Note that information indicating not to remove the film 68 (protective member) at a timing before the cutter 60 reaches the attached state is an example of the information indicating to transfer the film 68 from the intervening state to the removed state at a timing after the cutter 60 reaches the attached state.

The film 68 is attached to the cutter unit 6 (see FIG. 4 and FIG. 5). If the film 68 is attached to the casing 1*a* not to the cutter unit 6, it may be necessary to attach the film 68 to the casing 1*a* again when the cutter unit 6 is exchanged. On the contrary, in the case of the construction of the present disclosure, it is unnecessary to attach the film 68 to the casing 1*a* again. The user is not required to perform any complicated operation.

The film 68 is attached to the holder 61 of the cutter unit 6 (see FIG. 4 and FIG. 5). The area (front portion) of the film 68 between the proximity position M and a position at which the film 68 is attached to the holder 61, has the width that is longest at the proximity position M (front end) (width W1: see FIG. 6). In this case, even when the position of the film 68 is deviated in the widthwise direction (left-right direction), it is possible to allow the film 68 to intervene between the cutter 70 and the cutter 60.

The cutter unit 6 further includes the fixed member 65 which is fixed to the holder 61 so that the film 68 is covered with the fixed member 65 (see FIG. 5). In this case, the fixed member 65 can prevent the film 68 from being disengaged from the holder 61.

The film 68 has such a tapered shape that the width is gradually decreased toward the downstream side (rear) in the removal direction. As for the tapered shape, the width W2 of the portion pinched by or interposed between the pair of guide portions 8*g* is smaller than the width W1 of the portion disposed on the upstream side (front) in the removal direction as compared with the interposed portion (see FIG. 6). If the film 68 does not have the tapered shape as described above, and the film 68 has such a shape that the width is locally decreased at the portion pinched by or interposed between the pair of guide portions 8*g*, then the film 68 may be caught by the pair of guide portions 8*g*, and the film 68 may be broken when the film 68 is removed. On the contrary, in the case of the construction of this embodiment, the film 68 has the tapered shape as described above. Therefore, the film 68 is not caught by the pair of guide portions 8*g* when the film 68 is removed. It is possible to smoothly remove the film 68 without breaking the film 68.

When the cutter unit 6 is in the attached state, then the bent portion 68*c* of the film 68 is not arranged at the proximity position M, but the bent portion 68*c* is arranged in the first space V1 (space interposed between the base portion 70*a* of the cutter 70 and the base portion 60*a* of the cutter 60) (see FIG. 7B). If the bent portion 68*c* is arranged at the proximity position M, the film 68 is easily broken on account of the friction with the blades 70*b*, 60*b*. On the contrary, in this construction, the bent portion 68*c* is not arranged at the proximity position M, and hence it is possible to suppress the breakage of the film 68.

The second portion 68*b* (front end portion) of the film 68 has the slit 68*s* which extends in the direction (backward direction) directed from the second portion 68*b* to the first portion 68*a* (see FIG. 5). In this case, the force exerted from the blades 70*b*, 60*b* escapes in the left-right direction. Thus, it is possible to avoid the breakage of the second portion 68*b* which would be otherwise caused by the blades 70*b*, 60*b*.

The film 68 has the long hole 68*t* which intersects the slit 68*s* (see FIG. 5). In this case, the force, which is exerted from the blades 70*b*, 60*b*, escapes in the left-right direction more easily. It is possible to more reliably prevent the second portion 68*b* from being broken by the blades 70*b*, 60*b*.

The long hole 68*t* is provided at the bent portion 68*c* (see FIG. 5). In this case, the long hole 68*t* is provided at the bent portion 68*c* which is to be easily broken, and thus it is possible to prevent the bent portion 68*c* from being broken.

When the cutter 60 is in the attached state, the film 68 can be removed in the direction (backwardly) directed from the second portion 68*b* to the first portion 68*a*. In particular, when the film 68 is removed, the breakage of the film 68 as described above is apt to occur. However, for example, the arrangement of the bent portion 68*c*, the slit 68*s*, and the long hole 68*t* make it possible to suppress the breakage of the film 68.

As for the film 68, the angle of intersection θ, which is formed by the first portion 68*a* and the second portion 68*b*, is the obtuse angle. In this case, when the film 68 is removed, the film 68 is not caught by the blades 70*b*, 60*b*. The removing operation can be performed with ease.

Each of the cutters 60, 70 is made of the metal material. In this case, in particular, if the cutter 60 and the cutter 70 are brought in contact with each other when the cutter unit 6 transfers to the attached state (see FIG. 7B) from the detached state (see FIG. 7A), then at least one of the cutter 60 and the cutter 70 is likely to be damaged thereby. In such a situation, owing to the presence of the film 68, it is possible to effectively avoid the damage.

Second Embodiment

Figure 9:
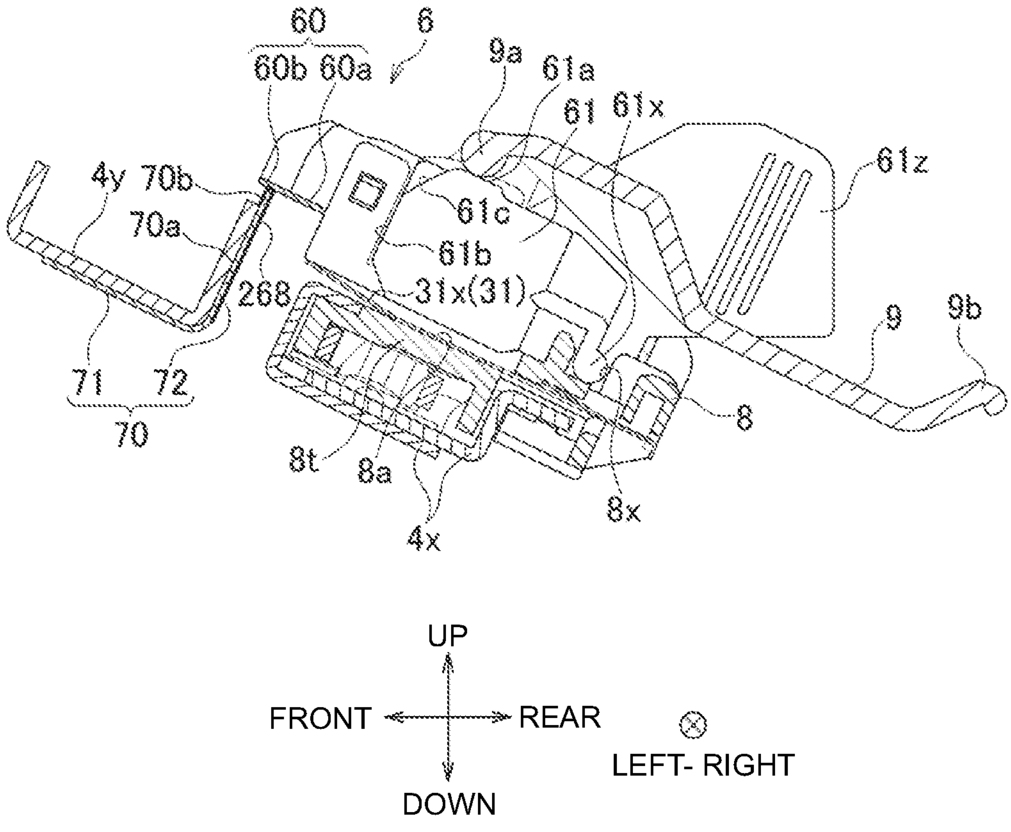
FIG. 9 is a side sectional view depicting a cutter unit in an attached state. The part depicted in the drawing corresponds to that of FIG. 7B.

Next, with reference to FIG. 9, an explanation will be made about a printer according to a second embodiment of the present disclosure.

In the first embodiment (see FIG. 4 and FIG. 5), the film 68 is attached to the cutter unit 6. On the contrary, in the second embodiment (see FIG. 9), a film 268 is attached to the cutter 70 which is supported by the casing 1*a*. The film 268 is fixed to the portion 72 so that the film 268 covers the blade 70*b* of the cutter 70 at the attachment position X (see FIG. 3).

According to this embodiment, the film 268 is supported by the casing 1*a*, and thus it is possible to precisely perform positioning of the film 268 with respect to the casing 1*a*.

Further, the film 268 is attached to the cutter 70, and thus it is possible to precisely perform positioning of the film 268 with respect to the cutter 70.

Further, the film 268 is attached to the attachment position X (outside the conveyance route T in the casing 1*a*) (see FIG. 3). In this case, the film 268 does not obstruct the conveyance action of the paper P. The film 268 may be removed from the attachment position X before performing the printing, or may be cut by the cutters 60, 70 in a case that the printing is performed.

Third Embodiment

Figure 10:
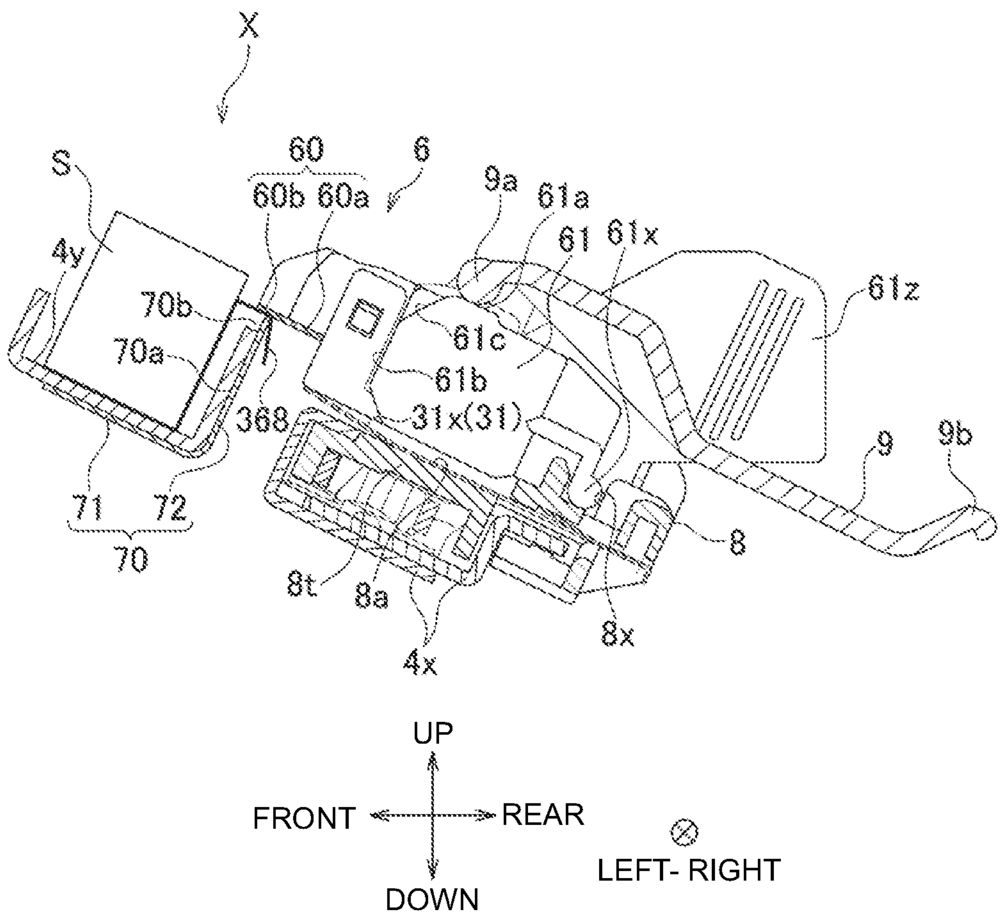
FIG. 10 is a side sectional view depicting a cutter unit in an attached state. The part depicted in the drawing corresponds to that of FIG. 7B.

Subsequently, with reference to FIG. 10, an explanation will be made about a printer according to a third embodiment of the present disclosure.

In the first embodiment (see FIG. 4 and FIG. 5), the film 68 is attached to the cutter unit 6. On the contrary, in the third embodiment (see FIG. 10), a film 368 is attached to the attachment sensor S supported by the attachment position X of the casing 1*a* (see FIG. 3). The film 368 is attached to the attachment sensor S so that the film 368 covers the blade 70*b* of the cutter 70 at the attachment position X.

According to this embodiment, the film 368 is supported by the casing 1*a*, and thus it is possible to precisely perform positioning of the film 368 with respect to the casing 1*a*.

Further, the film 368 is attached to the attachment sensor S, and thus it is possible to precisely perform positioning of the film 368 with respect to the attachment position X.

Further, the film 368 is attached to the attachment position X (outside the conveyance route T in the casing 1*a*) (see FIG. 3). In this case, the film 368 does not obstruct the conveyance action of the paper P. The film 368 may be removed from the attachment sensor S before performing the printing, or may be cut by the cutters 60, 70 in a case that the printing is performed.

Modified Embodiment

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

The cutter, which is included in the cutter unit, is disk-shaped and rotatable in the embodiments described above. However, the present disclosure is not limited thereto. The cutter included in the cutter unit may be fixed, like the cutter 70.

The first cutter, which is supported by the casing of the image recording apparatus, is fixed in the embodiments described above. However, the first cutter may be disk-shaped and rotatable, like the cutter 60.

The cutter is not limited to those made of metal materials. For example, the cutter may be made of a plastic material.

The protective member is not limited to those made of resin materials including, for example, polyethylene terephthalate. The protective member may be made of any arbitrary material (for example, silicon rubber, urethane rubber, Teflon ("TEFLON" is a registered trademark of THE CHEMOURS COMPANY FC, LLC) or the like). When the protective member is made of a rubber material, then the tensile strength (strength with respect to the tensile force) of the protective member is high, and it is possible to prevent the protective member from being broken when the protective member is removed from the casing. When the protective member is made of Teflon ("TEFLON" is a registered trademark of THE CHEMOURS COMPANY FC, LLC), then the coefficient of friction is small between the protective member and the cutter, and it is possible to reduce the tensile load when the protective member is removed from the casing.

The thickness of the protective member may be not less than 1 mm.

The slit, which is formed in the protective member, is not limited to a slit having the straight form such as those described in the foregoing embodiments (see FIG. 5). For example, the slit may have a groove or slop shape in which the width of the slit is larger than a width of the slit 68*s* depicted in FIG. 5. Further, the shape of the groove or slot may be, for example, U-shaped (shape in which the width is constant in the removal direction), or V-shaped (shape in which the width is progressively decreased toward the downstream side in the removal direction). The long hole 68*t* may be omitted depending on the shape of the slit.

The protective member may be incapable of being removed from the attachment position. In this case, the protective member may be broken in accordance with the cutting action.

The recording medium is not limited to paper. The recording medium may be cloth or plastic film. That is, the recording medium may be composed of any arbitrary material. Further, the recording medium is not limited to the sheet form.

The recording unit may eject any liquid other than the ink (for example, a processing liquid for coagulating or depositing any component contained in the ink). Further, the recording unit is not limited to the liquid ejection system. It is also acceptable to use the laser system, the thermal transfer system or the like.

The present disclosure is also applicable, for example, to facsimiles, copying machines, and multifunction machines, without being limited to the printer.

Note that, in the present disclosure, the wording of "a structure is supported by a casing" includes an aspect in which the structure is directly supported by the casing, and an aspect in which the structure is indirectly supported by the casing via other structure(s) supported by the casing. In the present disclosure, the wording of "a second cutter is configured to be attached to and detached from a casing" includes an aspect in which the second cutter is configured to be attached to and detached from the casing itself and an aspect in which the second cutter is configured to be attached to and detached from a structure directly or indirectly supported by the casing. In the present disclosure, the wording of "an attachment position of a casing" includes a position on the casing itself, and a position on a structure directly or indirectly supported by the casing.

Note that in the present disclosure, the wording of "the image recording apparatus comprising (including) a casing and a second cutter" includes both of the image recording apparatus in which the second cutter is attached to the casing, and the image recording apparatus in which the second cutter is detached from the casing. Thus, for example, a set or combination of the main body of the recording apparatus including the casing and the second cutter separated from the main body is an aspect of "the image recording apparatus comprising (including) a casing and a second cutter".

What is claimed is:

1. An image recording apparatus comprising:
- a conveyor configured to convey a recording medium;
- a recorder configured to record an image on the recording medium conveyed by the conveyor;
- a first cutter and a second cutter configured to cut the recording medium conveyed by the conveyor;
- a casing; and
- a protective member, wherein:
- the second cutter is configured to be in an attached state in which the second cutter is attached to the casing at an attachment position; and
- the protective member is configured to intervene between the first cutter and the second cutter to be attached to the casing at the attachment position.

2. The image recording apparatus according to claim 1, wherein the protective member is configured to be transferred from an intervening state in which the protective member intervenes between the first cutter and the second cutter to a removed state in which the protective member does not intervene between the first cutter and the second cutter, in a case that the second cutter is in the attached state.

3. The image recording apparatus according to claim 2, wherein the protective member is configured to be transferred from the intervening state to the removed state in a removing direction, the protective member having a grip portion disposed at a downstream end in the removing direction of the protective member.

4. The image recording apparatus according to claim 3, wherein information indicating to transfer the protective member from the intervening state to the removed state at a timing after the second cutter reaches the attached state is displayed on the grip portion.

5. The image recording apparatus according to claim 2, wherein:
- the casing has a pair of guide portions disposed on both sides in a widthwise direction of the protective member, the widthwise direction intersecting a removing direction along which the protective member is transferred from the intervening state to the removed state; and
- the protective member has a tapered shape in which length of the protective member in the widthwise direction is progressively decreased as a position in the protective member proceeds downstream in the removing direction, a first portion of the protective member disposed between the pair of guide portions having a length in the widthwise direction smaller than a length in the widthwise direction of a second portion disposed upstream in the removing direction of the first portion.

6. The image recording apparatus according to claim 1, further comprising a cutter unit which includes the second cutter and a holder holding the second cutter, the cutter unit being configured to be attached to and detached from the casing, wherein the protective member is attached to the cutter unit.

7. The image recording apparatus according to claim 6, wherein the protective member is attached to the holder, the protective member is configured to extend in an extending direction from a proximity position between the first cutter and the second cutter defined in a case that the second cutter is in the attached state, and a length of the protective member in a widthwise direction orthogonal to the extending direction in an area from the proximity position to a position at which the protective member is attached to the holder is longest at the proximity position.

8. The image recording apparatus according to claim 6, wherein:

the protective member is attached to the holder; and the cutter unit further includes a fixed member fixed to the holder so that the fixed member covers the protective member.

9. The image recording apparatus according to claim 1, wherein the protective member is supported by the casing.

10. The image recording apparatus according to claim 9, wherein the protective member is attached to the first cutter.

11. The image recording apparatus according to claim 9, further comprising an attachment sensor which is supported by the casing at the attachment position, and which is configured to detect that the second cutter is in the attached state, wherein the protective member is attached to the attachment sensor.

12. The image recording apparatus according to claim 9, wherein:

the attachment position is disposed on an outside of a conveying route through which the recording medium is conveyed by the conveyor; and the protective member is attached to the outside of the conveying route in the casing.

13. The image recording apparatus according to claim 1, wherein:

the first cutter extends in a first direction, the first cutter having a first base and a first blade provided at a forward end of the first base;

the second cutter extends in a second direction intersecting the first direction in a case that the second cutter is in the attached state, the second cutter having a second base and a second blade which is provided at a forward end of the second base;

the protective member has a first portion, a second portion, and a bent portion disposed at a boundary between the first portion and the second portion;

the first portion and the bent portion are arranged in a first space interposed between the first base and the second base, in the case that the second cutter is in the attached state; and the second portion extends from the first space through a proximity position between the first blade and the second blade to a second space disposed on a side opposite to the first space with respect to the proximity position, in the case that the second cutter is in the attached state.

14. The image recording apparatus according to claim 13, wherein:

the protective member is configured to be transferred from an intervening state in which the protective member intervenes between the first cutter and the second cutter to a removed state in which the protective member does not intervene between the first cutter and the second cutter in a removal direction in the case that the second cutter is in the attached state; and the removal direction is a direction directed from the second portion to the first portion.

15. The image recording apparatus according to claim 14, wherein an angle of intersection defined between the first portion and the second portion is an obtuse angle.

16. The image recording apparatus according to claim 1, wherein:

the first cutter and/or the second cutter has a base having a disk-shape and a blade provided at a periphery of the base;

the protective member has a first portion, a second portion, and a bent portion disposed at a boundary between the first portion and the second portion;

the second portion is opposed to the blade in a case that the second cutter is in the attached state; and the second portion has a slit extending in a direction directed from the second portion to the first portion.

17. The image recording apparatus according to claim 16, wherein the protective member further includes a long hole intersecting the slit, a length of the long hole in a direction intersecting a direction along which the slit extends is longer than a length of the long hole in the direction along which the slit extends.

18. The image recording apparatus according to claim 17, wherein the long hole is provided at the bent portion.

19. The image recording apparatus according to claim 1, wherein each of the first cutter and the second cutter is made of a metal material.

20. The image recording apparatus according to claim 1, wherein:

the second cutter is detachably attached to the casing; and the protective member intervenes between the first cutter and the second cutter.

21. A method for manufacturing an image recording apparatus as defined in claim 1, the method comprising:

attaching the second cutter to the casing; and transferring the protective member which intervenes between the first cutter and the attached second cutter to a state in which the protective member does not intervene between the first cutter and the second cutter.

* * * * *